Figure 3:
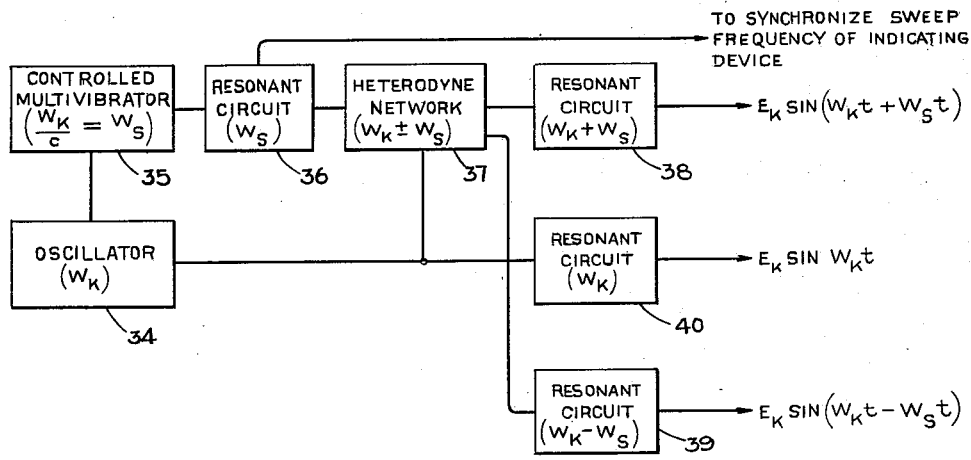

Dec. 5, 1961    D. F. LANGENWALTER ET AL    3,012,244
RECEIVER SCANNING SYSTEM
Filed Aug. 4, 1949    3 Sheets-Sheet 1
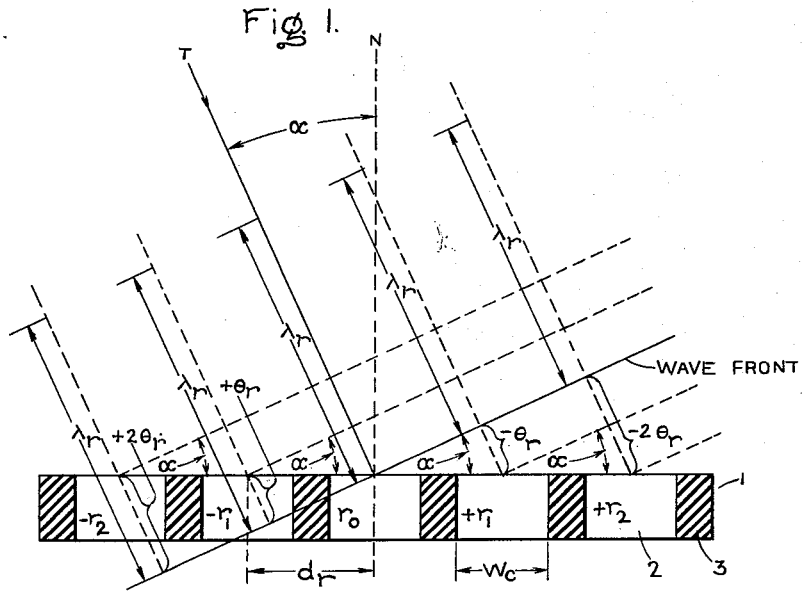
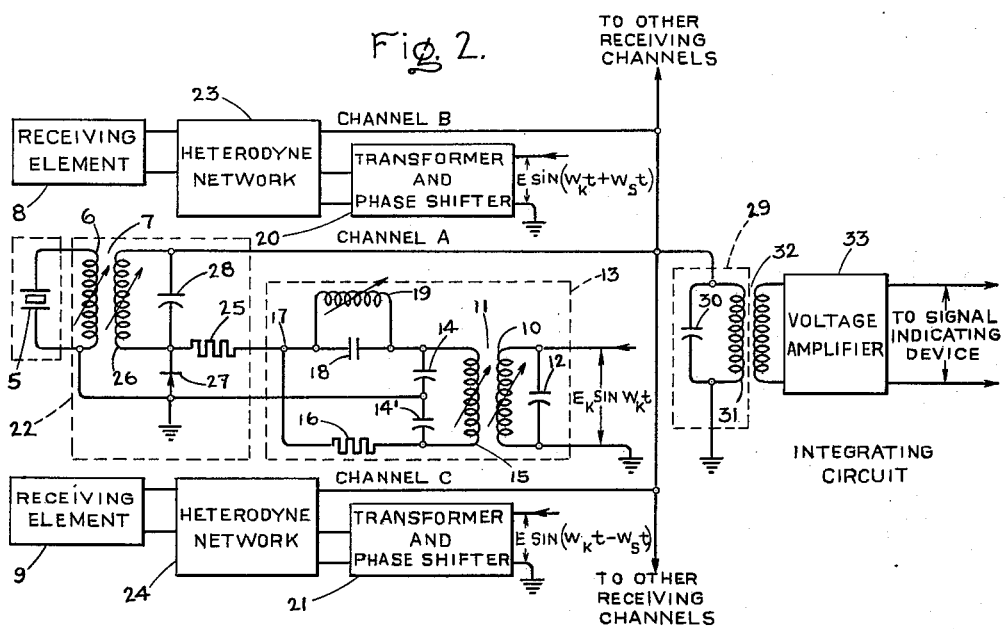
Inventors:
Daniel F. Langenwalter,
Kenneth M. Stevenson,
by Richard E. Hoaley
Their Attorney.

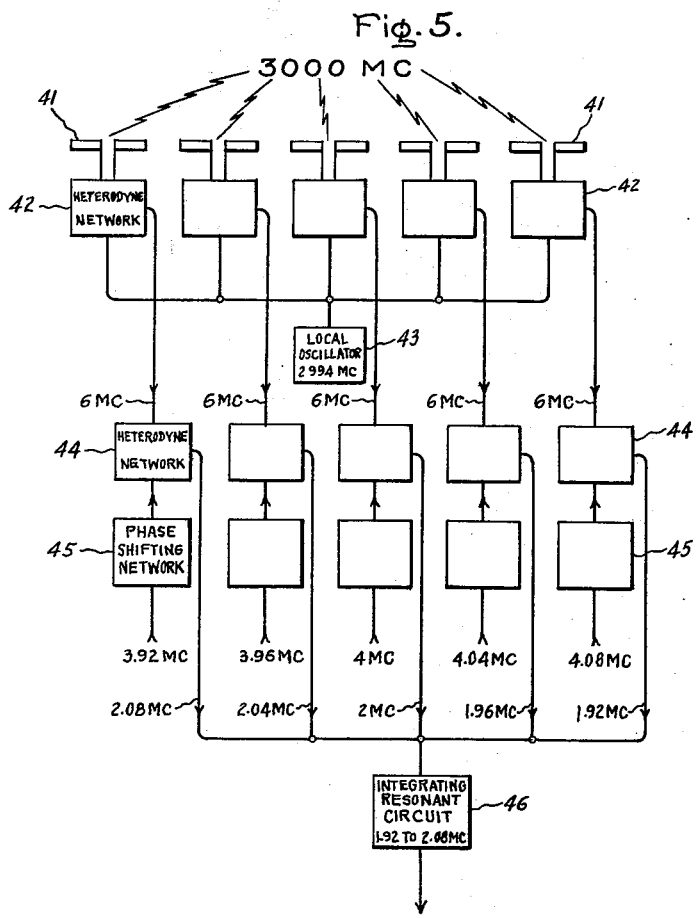

United States Patent Office 3,012,244
Patented Dec. 5, 1961

3,012,244
RECEIVER SCANNING SYSTEM
Daniel F. Langenwalter, Schenectady, N.Y., and Kenneth M. Stevenson, Vista, Calif., assignors to General Electric Company, a corporation of New York
Filed Aug. 4, 1949, Ser. No. 108,638
5 Claims. (Cl. 343—115)

Our invention relates to object locating systems and more particularly to object locating systems of the type employing an array of receiving elements having a narrow directive sensitivity pattern which can be varied to indicate the direction of incident propagated wave energy such as compressional or electromagnetic waves.

It is well known that a plurality of compressional or electromagnetic wave receiving elements can be arranged in an array to produce an integrated received signal which has considerable amplitude only when incident waves are propagated toward the array from a particular narrow sector within a field of search. The sector, to which the array responds at any instant of time, may be referred to as the "directive sensitivity pattern" of the receiving array. When employed in an object locating system, a wave is transmitted through a desired field of search and this narrow directive sensitivity pattern of the receiving array is varied throughout the field in an attempt to detect the echos of the transmitted wave. This type of object locating system is commonly referred to as a "receiver scanning system" in contrast with the type of object locating system employing a combination of a moving directive transmitted beam and a stationary receiver having a wide sensitivity pattern which is commonly referred to as a "transmitter scanning system."

One system which is employed to obtain the scanning action of a receiver is to rotate or oscillate mechanically a directive array of receiving elements about its axis. While suitable for tracking a moving object once it is located, this scanning system can not properly be used for target searching due to the difficulty of mechanically propelling the receiving array at a velocity sufficient to scan a large area within a proper length of time to produce the requisite signal definition.

Another system of obtaining receiver scanning is to arrange a plurality of receiving elements or arrays, each having a different direction of maximum sensitivity, into a total array covering a desired sector and to switch, either mechanically or electronically, from one receiver to the next. It will be appreciated that the sensitivity of a system of this type is limited by the amount of signal energy delivered by each directive receiving element individually, resulting in a considerable duplication of equipment and usually necessitating the use of sonic reflectors and complicated amplification systems. In order to obtain sufficient sensitivity and bearing accuracy, the directive sensitivity patterns of such systems have commonly also been limited to a scanning angle in the neighborhood of ±5° from the normal.

A principal object of our invention, therefore, is to provide in object locating systems new and improved apparatus for obtaining receiver scanning.

Another object is to provide apparatus whereby the direction of maximum sensitivity of a single array of propagated wave energy receiving elements can be varied electronically to scan through a comparatively wide sector without mechanical movement or switching.

In furtherance of this latter object, it is another object of the invention to provide improved apparatus for predeterminably displacing the relative phase of signals received by individual propagated wave energy receiving elements of a linear array, and for periodically synchronizing electrically this relative phase displacement of the individual received signals to effect a variation in the direction of a composite sensitivity pattern of the array.

An additional object of our invention is to provide a receiver scanning system having a predeterminable high scanning frequency.

A more specific object is to provide a receiver scanning system which inherently produces an alternating voltage representing the movement of the directive sensitivity pattern of the receiver. This alternating voltage may be employed to synchronize the movement of suitable indicating devices such as an oscilloscope beam to the movement of the receiver sensitivity pattern.

A further object of our invention is to provide new methods and apparatus for obtaining receiver scanning which can be adapted in an object locating system to indicate immediately the range and bearing of a target.

A still further object of our invention is to provide a receiver scanning system which is of simple and economical construction and yet can easily be adjusted or modified to meet many different requirements in object locating systems.

Broadly stated, our new system of obtaining receiver scanning is to heterodyne the signal received by each successively spaced receiving element of a conventional directive array with a corresponding one of a plurality of alternating modulating voltages predeterminably separated in frequency. The resultant sum or difference frequency components of the heterodyned voltages are filtered from the remaining components of the heterodyned wave. If either the sum or the difference components respectively are integrated to provide the algebraic or vectorial sum thereof, a directive sensitivity pattern of the entire array is produced which has maximum sensitivity to incident waves propagated from continually varying directions in the field, with the result that the receiver effectively scans electrically through a comparatively wide sector limited only by the minimum signal response angle of the individual receiving elements in the array. If the receiving elements are equally spaced, the resultant scanning frequency is equal to the difference frequency between any two adjacent modulating voltages.

Figure 4:
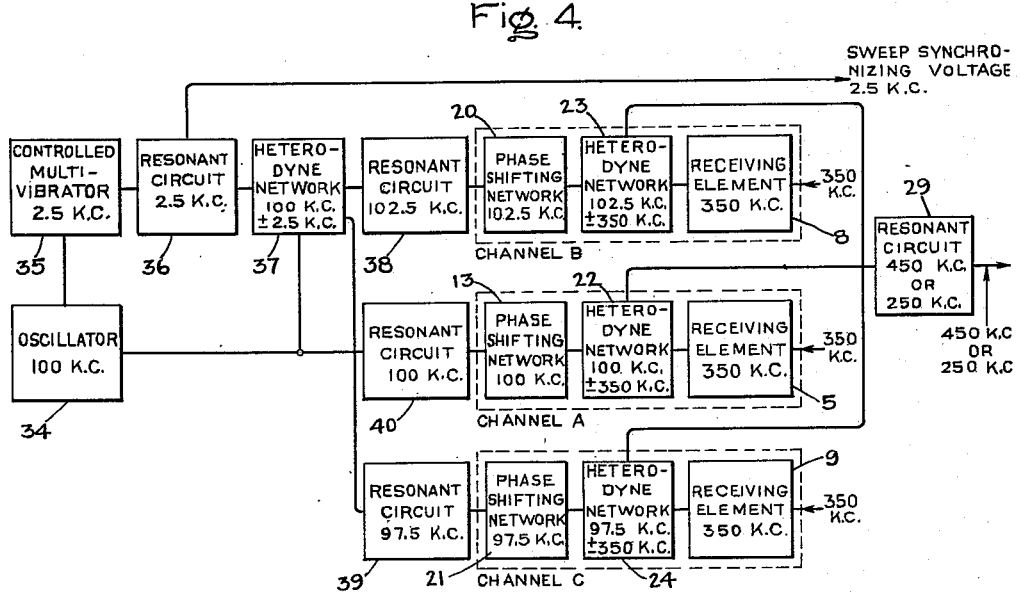

The novel features which we believe to be characteristic of our invention are set forth with particularity in the appended claims. Our invention itself, however, together with further objects and advantages thereof may best be understood by reference to the following description taken in connection with the accompanying drawing in which FIG. 1 is a diagrammatic view of a linear array of compressional wave receiving elements illustrating various phase relations of compressional waves reaching the array and useful in the explanation of our invention, FIG. 2 is a circuit diagram of one embodiment of our invention, FIG. 3 is a block diagram of a preferred system of generating certain alternating voltages necessary in the operation of our invention. FIG. 4 is a block diagram combining FIG. 2 and FIG. 3 and designating the frequencies of a typical group of modulating voltages which may be used in one embodiment of our invention, and FIG. 5 is a block diagram of a modification of our invention whereby it may be adapted for use with electromagnetic waves.

Referring to FIG. 1, we have diagrammatically illustrated an exemplary linear array 1 of piezo-electric compressional wave receiving elements 2 which may be, for example, 45° Y-cut Rochelle salt crystal elements, having an effective with $W_c$, equally separated by insulating bars 3, and having equal center-to-center distances $d_r$.

If a compressional wave of a constant frequency, such as may be produced by the echo of a transmitted compressional wave, is propagated toward the array from direction T at an angle α from the normal N to the plane of the array; the wave front, which may be represented by a line normal to the direction of the wave, passes with an equal time interval through each receiving element successively as illustrated by the dashed lines of FIG. 1. Since the compressional wave is of a constant frequency, it has a constant wave length in the medium designated in FIG. 1 as $\lambda_r$. Because of the sinusoidal character of a compressional wave, the instantaneous pressure of the wave upon any crystal element is a function of the maximum pressure, represented by the wave front, and the sine of a particular phase angle of the compressional wave cycle. As the compressional wave passes through a receiving element, equal time intervals will result in an equal phase displacement of the instantaneous pressure; and since the voltage delivered by each crystal element is proportional to the pressure of the incident wave, the voltage induced in each element, with reference to maximum voltage produced by the passage of the wave front, will also have an equal phase displacement between adjacent receiving elements which may be designated by $\theta_r$. This phase displacement of the instantaneous voltage induced between adjacent crystal elements is obviously a function of the wave length in the medium, the direction of wave propagation, and the construction of the receiving array; and may be determined from the relation $$\theta_r = \frac{2\pi d_r \sin \alpha}{\lambda_r}$$

If we assume as a reference that the time that the wave front reaches a central receiving element $r_0$ is equal to zero; then as indicated in FIG. 1, the phase displacement of the instantaneous pressure of the compressional wave reaching adjacent receivers on either side of the central element is $\pm \theta_r$; the phase displacement of the pressure of the wave reaching the next two receiving elements is $\pm 2\theta_r$ and the phase displacement of the $n$th more remote receiving elements is $\pm n\theta_r$. The instantaneous signal voltages developed by the receiver crystal elements $r_0$, $\pm r_1$, $\pm r_2$, and $r_n$ (not illustrated) are equal to the maximum voltages $E_r$ induced by the passage of the wave front multiplied by the sine of a proper phase angle as follows:

$$e_{r-2} = E_r \sin (w_r t + 2\theta_r)$$
$$e_{r-1} = E_r \sin (w_r t + \theta_r)$$
$$e_{r0} = E_r \sin w_r t$$
$$e_{r1} = E_r \sin (w_r t - \theta_r)$$
$$e_{r2} = E_r \sin (w_r t - 2\theta_r), \text{ and}$$
$$e_{rn} = E_r \sin (w_r t - n\theta_r)$$

where $w_r$ indicates the angular frequency of the incident compressional wave.

Maximum sensitivity of the receiving array obviously occurs when $\theta_r$ equals zero, i.e., when the compressional wave is propagated from a direction normal to the plane of the array. For this condition the total output voltage of the entire array when integrated to provide the algebraic sum thereof is equal to $$E_{total} = NE_r \sin w_r t$$

where N is the total number of receiving elements. For other values of $\theta_r$ the integrated output voltages of the entire array varies approximately in the following pattern $$E_{total} = E_r \frac{\sin \frac{N\theta_r}{2}}{\frac{\theta_r}{2}}$$

with the result that the amplitude of the integrated voltage for all values where $\theta_r$ is not equal to zero is smaller than the integrated voltage resulting when the wave is propagated from a direction normal to the plane of the receiver.

In order to understand our invention properly, it is desirable to examine the instantaneous voltage which will be induced in each receiving element if an equal and additional phase displacement of the instantaneous output voltage of each receiving element in succession were produced. The method by which such phase displacement may be produced will be explained hereinafter.

If this additional phase displacement of the instantaneous voltage is represented by $\theta_k$ the following voltages result:

$$e_{r-2} = E_r \sin (w_r t + 2\theta_r - 2\theta_k)$$
$$e_{r-1} = E_r \sin (w_r t + \theta_r - \theta_k)$$
$$e_{r0} = E_r \sin w_r t$$
$$e_{r1} = E_r \sin (w_r t - \theta_r + \theta_k)$$
$$e_{r2} = E_r \sin (w_r t - 2\theta_r + 2\theta_k), \text{ and}$$
$$e_{rn} = E_r \sin (w_r t - n\theta_r + n\theta_k)$$

which can also be written as follows:

$$e_{rn} = E_r \sin [w_r t - n(\theta_r - \theta_k)]$$

Under these conditions, the integrated voltage output of the receiver array when a compressional wave is propagated toward the array from a direction normal to the plane thereof, i.e., $\theta_r$ equals zero, is a function of $\theta_k$ and therefore will be smaller in amplitude than the previous total array voltage for this condition. However, when an incident wave is propagated toward the array from some angle of incidence $\alpha$, the resultant phase $\theta_r$ of the induced instantaneous voltage is equal to the additional phase displacement $\theta_k$; i.e., $\theta_r - \theta_k$ equals zero, and the amplitude of the integrated receiver array voltage output is maximum when a compressional wave is propagated from a direction defined by that particular angle of incidence $\alpha$. Therefore, by introducing additional phase displacement $\theta_k$ to the instantaneous output voltage of each receiving element in succession, the direction of an incident compressional wave which will produce a maximum integrated output of the entire receiver array is varied accordingly. This direction may be called the direction of the maximum sensitivity of the receiver.

Furthermore, it is evident that if this additional phase displacement $\theta_k$ is continually varied in a known manner with time, the direction of the maximum sensitivity of the receiver can also be varied through a sector limited only by the minimum response of the individual receiving elements.

A constantly varying phase displacement $d\theta/dt$ is defined in the art as a fixed angular frequency which is commonly expressed as $w_s$. Therefore, if a fixed angular frequency $w_s$ were added to the instantaneous voltage output of each receiver element in succession the voltages become:

$$e_{r-2} = E_r \sin (w_r t + 2\theta_r - 2w_s t)$$
$$e_{r-1} = E_r \sin (w_r t + \theta_r - w_s t)$$
$$e_{r0} = E_r \sin w_r t$$
$$e_{r1} = E_r \sin (w_r t - \theta_r + w_s t)$$
$$e_{r2} = E_r \sin (w_r t - 2\theta_r + 2w_s t), \text{ and}$$
$$e_{rn} = E_r \sin (w_r t - n\theta_r + nw_s t)$$

which also can be written as:

$$e_{rn} = E_r \sin [w_r t + n(w_s t - \theta_r)]$$

From the foregoing discussion, it is apparent that whenever $w_s t - \theta_r$ equals zero, the integrated voltage output of the entire array is maximum and maximum sensitivity of the array results. Since the instantaneous value of $w_s t$ is constantly changing, the direction of propagation of an incident compressional wave causing a phase displacement $\theta_r$ of the instantaneous output voltage of each successive receiving element which is equal to that instantaneous value of the additional phase displacement indicated by $w_s t$ must also change accordingly. Therefore, the direction of maximum sensitivity of the receiver produced whenever $w_s t - \theta_r$ equals zero varies through a determinable sector at a scanning angular frequency equal to $w_s$. Furthermore, as indicated by the immediately foregoing mathematical expressions, the voltage output of each receiving element $r_0$ to $\pm r_n$, when in this receiver scaning condition, may be represented by a voltage of a fixed frequency having a definite relation in frequency to the voltage output of the remaining receiving elements in the array. For the particular example mathematically demonstrated above, wherein a linear array of equally displaced receiving elements are employed, the frequency difference of the output voltages produced by any pair of adjacent receiving elements must be equal and may be expressed as the angular frequency $w_s$. If the receiver elements are unequally spaced, it is apparent that the frequency difference between any two adjacent receiving elements must be proportional to the distance between them.

One method which we employ to produce the proper frequency relations of the output voltage of each receiving element in succession is to heterodyne each one of a group of modulating alternating voltages properly separated in frequency with the signal voltage produced by the correspondingly spaced one of the receiving elements. As is well known in the art, the heterodyne process produces a plurality of frequency components of the original combined voltages including their sum and difference frequency components which are commonly referred to as their side band frequency components. Either of these side band frequency components may be filtered by such means as resonant circuits from the remaining components of the heterodyned voltages. The sum frequency component output voltages between adjacent heterodying networks has the same frequency difference in one particular direction as the frequency difference which exists between their correspondingly applied modulating voltages. The difference frequency component output voltages of these heterodying networks produce an identical phenomenon in an opposite direction. As explained previously, by integrating to provide the algebraic or vectorial sum of either the sum or the difference frequency output voltages respectively, the direction of the maximum sensitivity of the entire array is varied through a sector limited only by the minimum response angle of the individual receiving elements. If the sum frequency components are filtered and integrated, this receiver scanning phenomena effectively rotates across the field in a particular direction such as clockwise, and if the difference frequency components are filtered and integrated, the receiver scans in an opposite direction such as counterclockwise.

If a linear array of equally spaced receiving elements is employed, it is apparent that a group of modulating voltages equally separated in frequency will produce the proper frequency differential between the side band frequency components of the heterodyne output voltages of each receiving element. This latter phenomenon may be mathematically expressed in terms of an abstract channel $n$. The signal voltage produced by the nth receiver is $$e_{r_n} = E_r \sin (w_r t - n\theta_r)$$

This signal is heterodyned with a modulating voltage $e_{k_n}$ as follows:

$$e_{k_n} = E_k \sin (w_k t + n w_s t)$$

where $E_k$ is the amplitude of the modulating voltage and the remainder of the expression defines the frequency thereof; $w_k t$ indicates a central modulating frequency and $w_s t$ indicates the frequency differential between adjacent modulating voltages.

When the above-defined voltages are heterodyned and the sum frequency component is filtered from the remaining frequency components produced by the heterodyne process, the following voltage output results:

$$e_m = E_r E_k \sin [(w_r t + w_k t) + n(w_s t - \theta_r)]$$

where $(w_r t + w_k t)$ represents the sum frequency component and $(w_s t - \theta_r)$, as previously explained, represents the differential frequency which exists between the output voltages of adjacent receiving elements.

Similarly, if the difference frequency component is filtered, the following voltage output results $$e_d = E_r E_k \sin [(w_r t - w_k t) - n(w_s t + \theta_r)]$$

where the changes in sign indicate the change in the direction of scanning.

However, if the receiver elements are unequally spaced, it is apparent that the frequency difference between any two adjacent modulating voltages must be proportional to the distance between their associated receiving elements if the scanning action is to be preserved.

One embodiment of our invention is illustrated in FIG. 2 in which we have shown a circuit diagram of a central receiving channel A and a block diagram of similar adjacent channels B and C. Channel A is associated with a central compressional wave receiving element such as a crystal element 5 which is connected across the primary winding 6 of a transformer 7. Channel B is associated with a receiving element designated as block 8 on one side of and adjacent to receiving element 5, while channel C is associated with a receiving element designated as block 9 on the opposite side of and adjacent to element 5. Referring again to channel A, a modulating alternating voltage, mathematically designated as $E_k \sin w_k t$, is applied from a suitable alternating voltage generating means (not shown in FIG. 2) across a variable primary winding 10 of a transformer 11 which may be tuned by a parallel capacitor 12 to resonate at the frequency of this applied modulating voltage. Additional modulating alternating voltages predeterminably separated in frequency from the frequency of the modulating voltage applied to channel A are applied to channels B and C respectively. If the receiving elements 5, 8 and 9 are equally spaced in a linear array, receiver scanning at a constant velocity is achieved when the differential frequency between the frequency of these adjacent modulating voltages are equal. The modulating voltages applied to channel B and channel C for this condition are mathematically designated in FIG. 2 as $E \sin (w_k t + w_s t)$ and $E \sin (w_k t - w_s t)$ respectively, where $w_s t$ represents the angular difference frequency.

It has been found, in practice, that it is virtually impossible to produce the various modulating voltages that are applied to the different channels without introducing unpredictable small phase shifts due primarily to small differences in the phase characteristics of the modulating voltage generating means itself. The above theoretical discussion and mathematical analysis is predicated upon the hypothesis that the individual heterodyned signals from each receiving element will pass periodically through the same phase angle at the same instant of time. It is preferable that this heterodyned zero relative phase angle condition coincide with the zero relative phase angle condition that exists when a wave is incident upon the array from a direction normal to the plane thereof.

For optimum operation of our invention, therefore, it is preferable that the phase angle of the instantaneous modulating voltage applied to a heterodyning means in each channel be adjustable so that all of these modulating voltages may have the same phase angle at one particular instant of time. When properly aligned, this phase condition will reoccur at a frequency equal to the difference frequency between the modulating voltages applied to adjacent channels. In order to permit this phase adjustment, a phase shifting network is preferably included in each channel.

This phase shifting network 13, in one form as illustrated in channel A, may include a pair of identical capacitors 14 and 14' which are connected in series across the secondary winding 15 of transformer 11 and which have their common connecting lead connected to ground. As is well known in the art, capacitors 14 and 14' function as a voltage dividing network to produce equal and opposite voltages with respect to ground at each end of the secondary winding 15. One end of this secondary winding 15 is connected through a resistive element 16 to a common point 17 while the other end of winding 15 is connected thereto through a capacitor 18 and a variable inductance 19 connected in parallel across capacitor 18. The amplitude and phase angle of the voltage developed between the common point 17 and ground is obviously the result of the vectorial voltage components applied thereto form both ends of winding 15 of transformer 11. Since the voltage applied to common point 17 through the resistive element 16 is always in phase with one end of the transformer winding 15, the phase angle of the combined voltages at common point 17 will be determined by the lag or lead of the voltage delivered from the other end of winding 15 through capacitor 18 and inductance 19. By adjusting inductance 19, the network comprising capacitor 18 and inductance 19 can be tuned to resonate at a frequency above or below the frequency of the applied modulating voltage. As is well known in the art this resonant circuit appears as a variable reactance, either inductive or capacitive, interposed between the end of winding 15 and the common point 17 and thereby causes the phase angle of voltage at the common point 17 either to lag or to lead the phase angle of the applied modulating voltage.

Similar phase shifting networks 20 and 21 are included in each receiver channel such as channels B and C. The voltage output of each phase shifting network 13, 20, and 21 in each channel is applied to corresponding heterodying networks 22, 23 and 24 which function to heterodyne the modulating voltage with the signal voltage developed by an associated crystal element.

A preferred heterodying network 22 is illustrated in channel A and comprises a series decoupling resistor 25 connected from point 17 to one end of the secondary winding 26 of transformer 7. A non-linear detecting device such as a rectifier element 27 is also connected from the same end of winding 26 to ground. This secondary winding 26 of transformer 7 is preferably tuned by a capacitor 28 to resonate at the frequency of the signal voltage delivered to the primary winding 6 of the transformer 7 by crystal element 5.

In the operation of this heterodyning network, the alternating modulating voltage $E_k \sin w_k t$ applied across the non-linear detecting element 27 from the output of the phase shifting network 13 functions to interrupt the current flowing through the detecting element 27 during the alternate half cycles of the modulating voltage which cause the lower end of the secondary winding 26 of transformer 7 to be negative with respect to ground. Since the secondary winding 26 is connected in series with the detecting element 27, current flows through the secondary winding 26 of the transformer 7 only during that portion of the modulating voltage cycle which permits the detecting element 27 to be conductive. In addition, the alternating currents which are induced in the secondary winding 26 of the transformer 7 by the signal voltage output of crystal element 5 which is applied across the primary 6 of the transformer 7 are also rectified by the action of detecting element 27. The voltages developed between the top of the secondary winding 26 and ground are therefore the result of the mixing of the rectified modulating voltage and the rectified signal voltage, and have many different frequency components as is well known in the art. The two principal frequency components of this heterodyned output are the sum and difference frequency components of the original applied voltages.

Similar heterodyned output voltages are produced in the heterodyning networks 23 and 24 of the adjacent channels B and C and have side band frequency components which, as previously explained, are separated in frequency from the heterodyned output of the central channel A by a fixed frequency which may be represented by $\pm(w_s t + \theta_r)$.

The output voltages of each receiver channel A, B and C are connected to an integrating network 29 which in one form as illustrated, may be a simple parallel resonant circuit comprising a capacitor 30 connected across the primary winding 31 of an integrating transformer 32. This resonant circuit is constructed to be broadly resonant to one of the side band frequencies of the heterodyned output of the central channel A. This resonant circuit functions to present a high impedance to all frequency components at or near this side band frequency and to present a low impedance to all other frequency components, thereby filtering the particular side band frequency component to which it is tuned from the remaining frequency components of the heterodyned output voltage. Since this resonant circuit is broadly tuned, it presents a similar high impedance to the corresponding side band frequency components of all the receiving channels and functions to integrate all of these frequency components. The resultant integrated output of transformer 32 is preferably amplified by a conventional voltage amplifier designated as block 33 and applied to a proper signal indicating device (not shown).

It is to be understood of course that although three channels are illustrated in FIG. 2, many more may be employed depending upon the number of receiving elements in the array. As is well known in the art, the greater the length of the receiving array, the greater will be its directivity and sensitivity.

Referring to FIG. 3, we have shown in block diagram form, one system for obtaining the various modulating voltages employed in our invention. A master oscillator 34 which produces a sinusoidal voltage of a constant angular frequency $w_k$ synchronizes the operation of a conventional multivibrator 35 in which the time constants of the multivibrator circuit are adjusted to provide a square wave output, the fundamental frequency component of which is a fixed ratio of the frequency of the oscillator voltage. The output of this controlled multivibrator 35 is passed through a resonant circuit 36 tuned to resonate at a harmonic frequency component of the square wave such as the fundamental frequency component $w_s$ of the square wave and applied to a balanced heterodyning network 37 which heterodynes the master oscillator output voltage with the output of this latter resonant circuit to produce their sum and difference frequency components ($w_k \pm w_s$). The voltage output of the balanced heterodyning network 37 is applied across two resonant circuits 38 and 39, one of which is tuned to resonate at the sum frequency component ($w_k + w_s$) of these heterodyned voltages and the other of which is tuned to resonate at the difference frequency component ($w_k - w_s$) thereof. The voltage outputs of these latter two resonant circuits together with the output of the master oscillator delivered through a third resonant circuit 40 tuned to resonate at the frequency of the master oscillator voltage $w_k$, provide three modulating voltages $E_k \sin w_k t$, $E_k \sin (w_k t + w_s t)$, and $E_k \sin (w_k t - w_s t)$ each separated by an equal angular difference frequency $w_s$.

Referring to FIG. 4, we have combined, in block diagram form, the various networks illustrated in FIGS. 2 and 3 and have indicated the frequencies of one typical combination of modulating voltages which may, for example, be employed with an incident compressional wave of a frequency of 350 kilocycles. The legend in each block indicates the major frequency components of the voltage in the network represented by the block and may be easily understood by reference to the foregoing discussion of the individual networks.

As explained previously, the effective scanning frequency of an array of equally spaced receiving elements will be equal to the difference frequency between the heterodyned output voltage of adjacent channels. In the particular embodiment of our invention illustrated in FIGS. 3 and 4, this difference frequency is obviously equal to the fundamental frequency component of the controlled multivibrator 35. Therefore, as indicated in FIGS. 3 and 4, the output of the resonant circuit 36 associated with the controlled multivibrator 35 can also be used in a manner well known in the art to synchronize a sweep generating circuit of an indicating device such as by being connected to the sweep frequency synchronizing input terminal of an oscilloscope, in order to cause the oscilloscope beam to move in synchronism with the movement of the sensitivity pattern of the receiver.

It will be appreciated, of course, that the output of the receiver circuit of FIG. 2 may also be applied to the signal receiving terminals of an oscilloscope to modulate the intensity of the oscilloscope beam by the integrated receiver output so that a bright spot at a certain point on the oscilloscope screen indicates an object at a definite position in the field.

It will also be appreciated that a receiver scanning system such as herein described may be constructed to have an extremely high scanning frequency to permit clear target definition. Furthermore, since the scanning is accomplished by electronic means alone, the entire system can easily be combined with a mechanical tracking system to give coverage throughout a 360° field of search.

Referring now to FIG. 5 we have shown a simplified diagram of a modification of our invention whereby it may be employed in conjunction with an object locating system using electromagnetic waves. It is well known that if a plurality of dipoles are arranged into a linear array which is many wave lengths long at the frequency of the electromagnet waves to be received, this array will have a directive sensitivity pattern which has the same general characteristics and follows laws which are analogous to those previously explained in conjunction with a linear array of crystal receiving elements and lower frequency compressional waves. However, because of the difficulty of constructing stable and efficient oscillatory circuits at the high frequencies normally employed in object locating systems using electromagnetic waves, we prefer to convert the frequency of the received signal of each dipole to a lower intermediate frequency before it is heterodyned with a corresponding one of a plurality of generated modulating voltages determinably separated in frequency as previously outlined. In order to clarify the explanation of the operation of this modification of our invention, we have also indicated in FIG. 5 the frequencies of a typical group of signal and modulating voltages which may be employed.

In FIG. 5 we have shown a linear array of equally spaced dipoles 41 constructed to produce signal voltages responsive to incident electromagnetic waves having, for example, a frequency of 3000 megacycles. The signal voltage induced in each of these dipoles 41 is applied to a corresponding heterodyne network, indicated as block 42 and is heterodyned with the signal provided by the same local oscillator 43 operating at a frequency very close to the frequency of the incident electromagnetic wave in order to produce a much lower intermediate frequency signal voltage. In the instant embodiment of our invention we have indicated a local oscillator 43 having an output voltage with a frequency of 2994 megacycles which is heterodyned with the input received signals of 3000 megacycles to produce a plurality of intermediate frequency signals of 6 megacycles. Since each incoming signal voltage is heterodyned with the voltage produced by the same local oscillator, the relative phase displacement of the signal voltages will, of course, be preserved.

Each of these intermediate frequency signals are heterodyned through a proper high frequency heterodyning network 44 with a corresponding one of a plurality of modulating voltages separated in frequency by amounts proportional to the spacing between the dipoles with which they cooperate. Since the dipoles 41 of FIG. 5 are equally spaced, the typical modulating voltages, as indicated in FIG. 5, are also equally separated in frequency; and range, for example, from 3.92 megacycles to 4.08 megacycles in increments of frequency equal to 40 kilocycles. Each of the plurality of modulating voltages is passed through a phase shifting network 45 before being applied to the heterodyned network 44, which phase shifting network 45 fulfills the same function as phase shifting network 13 of FIG. 2.

Since this differential frequency between the modulating voltages (40 kilocycles) determines the scanning frequency of the array, it is desirable to keep this differential frequency below 1 megacycle due to the difficulty which may be encountered in synchronizing a proper signal indicating device such as an oscilloscope to a very high scanning frequency.

The heterodyned output of each of these heterodyning networks indicated by blocks 44 are then applied to an integrating resonant circuit 46 broadly tuned to cover a frequency band including all of the side band frequency components which are filtered by the networks 44. As indicated by the legend in block 46, we preferably filter the difference frequency components of the heterodyned voltages in order to lower the frequency utilized as well as to minimize the possibility of harmonic interference. The output of the integrating resonant circuit designated by block 46 may thereafter be employed in the same manner as the output of the previously described integrating resonating circuit designated by block 29 in FIG. 4.

While we have shown a particular embodiment of our invention, it is to be understood that we do not wish to be limited thereto since many modifications may be made, and we, therefore, contemplate by the appended claims to cover all such modifications as fall within the true spirit and scope of our invention.

What we claim as new and desire to secure by Letters Patent of the United States is:

1. In combination, an array of spaced propagated wave energy receiving elements adapted to produce signal voltage responsive to incident waves, said array having a directive pattern of sensitivity, alternating voltage generating means to produce a plurality of modulating voltages separated in frequency by amounts proportional to the relative spacing of said receiving elements, phase shifting means connected to said alternating voltage generating means for adjusting the relative phase of said modulating voltages to have a same periodically recurring instantaneous phase angle, means to heterodyne each of said phase adjusted modulating voltages with the signal produced by a correspondingly spaced one of said receiving elements to provide the side band frequency components thereof, and integrating means responsive to the same side band frequency component of each heterodyned signal to provide the algebraic sum thereof, thereby to vary the direction of said sensitivity pattern through a predetermined spatial sector.

2. In combination with an array of linearly spaced wave receiving elements adapted to produce signal voltages proportional to incident waves and having a directive pattern of maximum sensitivity normal to the plane thereof, electronic means to vary the direction of said sensitivity pattern comprising, alternating voltage generating means to provide a plurality of modulating voltages separated in frequency by an amount proportional to the spacing between said receiving elements, a phase shifting network connected to receive each said modulating voltages to permit adjustment of the phase angle thereof to have a same periodically recurring instantaneous phase angle, a plurality of non-linear detectors, each of said detectors being responsive to one of said phase adjusted modulating voltages and to the signal voltage produced by a correspondingly spaced one of said receiving elements to produce the side band frequency components thereof, and integrating means connected to receive each of said detected signals and constructed to provide a voltage representing the vectorial sum of the same one of said side band frequency components.

3. In an object locating system, a linear array of equally spaced compressional wave receiving elements adapted to produce signal voltages proportional to incident compressional waves, said array having a directive pattern of maximum sensitivity normal to the plane thereof, an alternating voltage generating means constructed to produce a plurality of modulating voltages separated in sequence by a frequency difference equal to a predetermined scanning frequency, a plurality of heterodyning networks, each of said networks being responsive to one of said modulating voltages and the signal voltage produced by a correspondingly spaced one of said receiving elements to produce either the sum or the difference frequency components thereof, said alternating voltage generating means including a phase shifting network for adjusting the relative phase of said modulating voltages to have a same instantaneous phase angle periodically recurring at a frequency equal to said frequency difference, and an integrating network connected to receive said heterodyned frequency components and constructed to provide the vectorial sum of the same one thereof, thereby to cause said sensitivity pattern to scan through a determinable spatial sector at said predetermined scanning frequency.

4. In an object locating system, a linear array of equally spaced electromagnetic wave receiving elements adapted to produce signal voltages proportional to incident electromagnetic waves of ultra high frequency, said array having a directive pattern of maximum sensitivity normal to the plane thereof, an oscillator for generating alternating voltage of a substantially constant ultra high frequency, means for heterodyning said generated ultra high frequency voltage with each signal voltage produced by said receiving elements to convert said received signal voltages into an equal number of lower frequency signal voltages having the same relative phase relations, a modulating voltage generating means constructed to produce a plurality of modulating voltages separated in sequence by a frequency difference equal to a predetermined scanning frequency, a plurality of heterodyning networks, each of said networks being responsive to one of said modulating voltages and the lower frequency signal voltage converted from the signal received by a correspondingly spaced one of said receiving elements to produce their side band frequency components, and an integrating network connected to receive the resultant plurality of heterodyned signals and constructed to provide the algebraic sum of the same side band frequency component thereof, thereby to cause said sensitivity pattern to scan through a determinable sector at said scanning frequency.

5. In a receiver scanning system means for generating a plurality of modulating voltages of constant frequency each sequentially separated in frequency by an equal difference frequency comprising, an oscillator for producing a sinusoidal voltage of substantially constant frequency, a multivibrator synchronized by said oscillator voltage to provide a square wave voltage having a fundamental frequency component equal to a predetermined fraction of said oscillator voltage frequency, means to heterodyne at least one harmonic frequency component of said square wave voltage with said oscillator voltage to obtain the side band frequency components thereof, and resonant circuit means for filtering each said side band frequency components.

References Cited in the file of this patent
UNITED STATES PATENTS

| | | |
|---|---|---|
| 2,409,944 | Loughren | Oct. 22, 1946 |
| 2,426,460 | Lewis | Aug. 26, 1947 |
| 2,429,726 | Lewis | Oct. 28, 1947 |
| 2,430,296 | Lewis | Nov. 4, 1947 |
| 2,437,281 | Tawney | Mar. 9, 1948 |